United States Patent [19]
Hattori et al.

[11] Patent Number: 6,025,896
[45] Date of Patent: Feb. 15, 2000

[54] DISPLAY DEVICE

[75] Inventors: Yasuhiro Hattori; Jun Ikami, both of Nagoya, Japan

[73] Assignee: Brother Kogyo Kabushiki Kaisha, Nagoya, Japan

[21] Appl. No.: 09/166,925

[22] Filed: Oct. 6, 1998

[30] Foreign Application Priority Data

Oct. 9, 1997 [JP] Japan .................................. 9-277056

[51] Int. Cl.$^7$ .......................... G02F 1/1333; C09K 19/02
[52] U.S. Cl. .............................. 349/86; 349/89; 349/90; 349/183
[58] Field of Search ................. 349/86, 88, 89, 349/90, 92, 165, 183

[56] References Cited

U.S. PATENT DOCUMENTS

| | | | |
|---|---|---|---|
| 2,800,457 | 7/1957 | Green et al. | 427/213.34 |
| 2,800,458 | 7/1957 | Green | 428/402.2 |
| 4,089,802 | 5/1978 | Foris et al. | 428/402.2 |
| 5,178,571 | 1/1993 | Mase | 349/89 |
| 5,312,575 | 5/1994 | Wills | 264/109 |
| 5,499,121 | 3/1996 | Brewer | 349/89 |

FOREIGN PATENT DOCUMENTS

| | | |
|---|---|---|
| 952807 | 3/1964 | United Kingdom . |
| 965074 | 7/1964 | United Kingdom . |

*Primary Examiner*—William L. Sikes
*Assistant Examiner*—Dung Nguyen
*Attorney, Agent, or Firm*—Oliff & Berridge, PLC

[57] ABSTRACT

The display device, which is devoid of display defects and capable of being drived with low power, comprises a large number of microcapsules 10 in which disperse systems of charged particles 2 in a liquid dispersion medium 4 are encapsulated, and a pair of transparent electrodes 14 faced to each other disposed such that these microcapsules 10 is sandwiched therebetween. The diameters of the charged particles 2 are about $1/1000$ to about $1/5$ of the particle diameters of the microcapsules 10, and the charged particles 2 are dispersed such that the dispersion degree of the particle diamter distribution, expressed as volume-average particle diameter/number-average particle diameter, ranges from 1 to about 2, where the volume-average particle diameter indicates an average particle diameter derived from a volume-based particle diameter distribution and the number-average particle diameter indicates an average particle diameter derived from a number-based particle diameter distribution.

7 Claims, 5 Drawing Sheets

DISPLAY DEVICE

BACKGROUND OF THE INVENTION

1. Field of the Invention

The present invention relates to a display device using charged particles that move between electrodes upon the application of an electric field in a dispersion medium. More particularly, the present invention relates to a display device in which disperse systems of charged particles in a dispersion medium are encapsulated in individual microcapsules, and images are formed by controlling the direction of movement of the charged particles by the application of a controlling electric field.

2. Related Art of the Invention

Japanese Patent Publication 52-28554 and numerous other reports describe image display devices for moving particles between electrodes by the application of an electric field and forming images on the screen. These display devices are constituted such that disperse systems of particles in a liquid dispersion medium are placed between a pair of electrodes faced to each other at least one of which is transparent, an electric field is applied between these electrodes, and the particles in the dispersion medium are controlled depending on their polarity so as to be attracted to or repelled by the transparent electrode plate to display the desired images.

The following materials may commonly be employed as the liquid dispersion medium for the disperse systems: aliphatic hydrocarbons, aromatic hydrocarbons, alicyclic hydrocarbons, halogenated hydrocarbons, various esters, alcohol-based solvents, and various other oils. These may be used independently or as appropriate mixtures to which emulsifiers, surfactants, or the like have been added in an appropriate manner. In addition, the following may be used as the particles: conventional colloid particles, various organic or inorganic pigments or dyes, metal powders, fine glass or resin powders, and the like.

With a structure in which disperse systems are merely placed between electrodes, however, display defects tend to occur due to particle aggregation and the adhesion of particles to the electrodes. Structures have therefore been proposed in which perforated spacers shaped as porous materials or meshes provided with a large number of through holes are disposed between a pair of electrodes, and the disperse systems are broken up into a discontinuous arrangement, making it possible to stabilize display manners.

In electrophoretic display devices provided with perforated spacers, the disperse systems are placed in each of the through holes after the perforated spacers have been interposed between the electrodes. However, there is a problem that it is very difficult to uniformly fill each of the numerous through holes with the disperse systems.

As a method of overcoming the aforementioned disadvantage, a method in which disperse systems of particles in a liquid dispersion medium are individually encapsulated in microcapsules is described in Japanese Patent Application Laid-Open No. 64-86116. Because this method can prevent particles from aggregating or adhering to the electrodes, it suppresses the formation of so-called display defects and makes it easier to fill the spaces between the electrodes with the dispersion medium.

However, the above-described method, when the particles in the microcapsules have nonuniform diameters, is still unable to prevent display defects from occurring during image formation, because there is a possibility that those particles will be very large or very small, or the amount of these particles encapsulated in the microcapsules will be very large or very small. Since the particles with nonuniform diameters vary apparent charges in the liquid dispersion medium, the migration rate of the particles varies during the application of low voltage, making it difficult to drive the device with low power.

It is difficult to independently control the color and charge polarity of particles contained in the liquid dispersion medium when these particles are conventional colloid particles, various organic or inorganic pigments, or the like. Therefore, when two types of particles having different colors and charge polarities are encapsulated within microcapsules, it is also difficult to control the direction of migration of each type of particle to form images having the desired colors.

In a case of a system in which a single type of particle is caused to move in microcapsules to form an image, when the controlling electric field is switched off, the particles in the capsules float to the top or sink to the bottom, depending on the relation of their specific gravity to that of the liquid dispersion medium. The controlling electric field must therefore be constantly applied in order to preserve the images on the screen.

SUMMARY OF THE INVENTION

An object of the present invention, which has been accomplished in order to overcome the aforementioned drawbacks, is to provide a display device which is devoid of display defects and which can be driven with low power.

Aimed at attaining the stated object, the present invention provides a display device comprising a large number of microcapsules in which disperse systems of charged particles in a dispersion medium are encapsulated, and a pair of electrodes faced to each other disposed such that these microcapsules are sandwiched therebetween. In this display device, optical reflection characteristics are varied and the desired display operation are executed by varying the dispersion state of the aforementioned charged particles under the action of controlling voltage, where the diameters of the aforementioned charged particles are about $1/1000$ to about $1/5$ of the particle diameters of the aforementioned microcapsules, and the aforementioned charged particles are dispersed such that the degree of dispersion of the particle diameter distribution, expressed as volume-average particle diameter/number-average particle diameter, ranges from 1 to about 2, where the volume-average particle diameter indicates an average particle diameter derived from a volume-based particle diameter distribution and the number-average particle diameter indicates an average particle diameter derived from a number-based particle diameter distribution.

Consequently, setting the diameters of the charged particles within the aforementioned range makes it possible to uniformly disperse the charged particles in the emulsion during microcapsule manufacture and to optimally adjust the amount of the charged particles dispersed in the space inside the microcapsules.

The display defects occurring during image formation can thus be prevented. In addition, the migration rate of each charged particle can be kept constant even when the display device is driven with low power, because the apparent electric charge on the particles in the liquid dispersion medium is kept uniform.

Furthermore, in the display device, it is preferable that the particle diameters of the aforementioned microcapsules are about 5 μm to about 200 μm. Images can therefore be displayed with high picture quality.

Moreover, in the display device, it is preferable that the volume of each of the aforementioned charged particles constitutes from about 1.5% to about 25% of the volume of the corresponding microcapsule; and that the total volume of all the charged particles in the aforementioned microcapsules constitutes from about 1.5% to about 50% of the volume of the aforementioned microcapsules. Consequently, adequate images can be formed and good response can be obtained as a result of the fact that the volume of the charged particles contained in the microcapsules falls within the aforementioned range in relation to the volume of the microcapsules.

In addition, in the display device, it is preferable that the aforementioned large number of microcapsules are supported on a flexible medium. The numerous microcapsules supported on the flexible medium can therefore display images on a curved surface.

Furthermore, in the display device, it is preferably that the aforementioned charged particles are comprised of at least one type of polymerization particles. Consequently, using polymerization particles as the aforementioned charged particles makes it easier to adjust their particle diameter distribution.

The coloration and charging of the polymerization particles can also be readily controlled because colorants or charge-controlling agents can be easily added during the manufacture of the particles. Another advantage is that the presence of a plurality of charged particles in the microcapsules dispenses with the need for continuous application of a controlling electric field in order to preserve the displayed images, because the images displayed on the screen can be preserved for some time through interaction among the charged particles of various characteristics in the microcapsules even when the controlling electric field is no longer applied.

This and other objects, features and advantages of the present invention are described in or will become apparent from the following detailed description of the invention.

DETAILED DESCRIPTION OF THE INVENTION

The present invention will now be described through a specific embodiment with reference to drawings.

Figure 1:
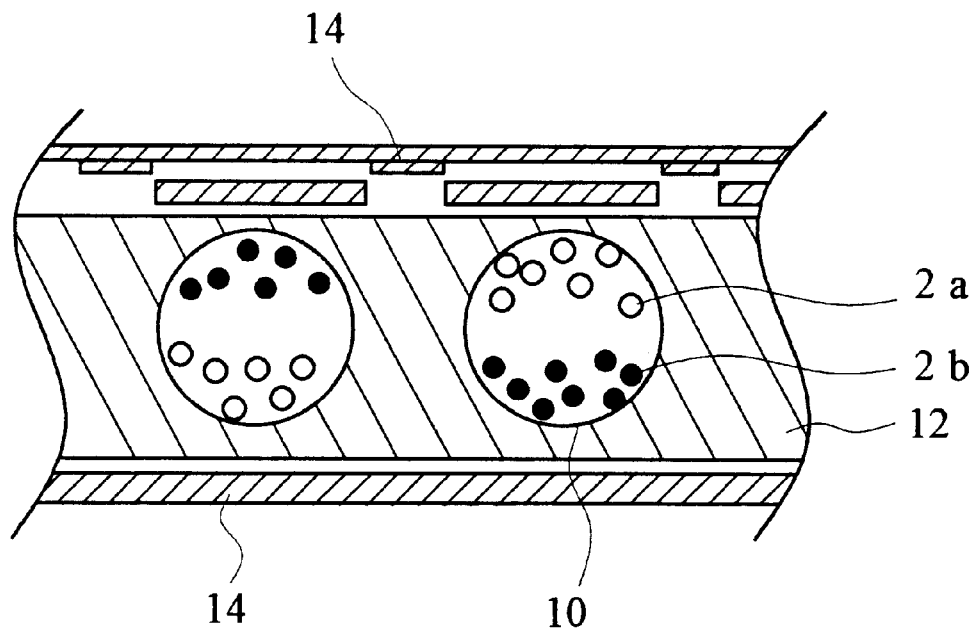
FIG. 1 is a schematic block diagram depicting the overall structure of the display device in accordance with an embodiment of the present invention.

As in FIG. 1, the display device according to this embodiment is constituted such that a large number of microcapsules 10 held and supported by a flexible medium 12 are sandwiched between two transparent electrodes 14. The transparent electrodes 14 constitute the facing electrodes in the present invention.

The microcapsules 10 are consitituted in which disperse systems obtained by dispersing charged particles 2a and 2b in a liquid dispersion medium 4 are encapsulated.

The transparent electrodes 14 comprise a pair of flexible electrodes faced to each other, at least one of which is transparent.

The flexible medium 12 is a transparent sheet made from PET (polyethylene terephthalate) or another material.

The method for manufacturing the microcapsules 10 in accordance with the present embodiment will now be outlined.

Microcapsules can be fabricated by the methods representing what is already considered conventional technology in the industry. Examples include, but are not limited to, techniques involving phase separation from aqueous solutions such as those described in U.S. Pat. Nos. 2,800,457 and 2,800,458; interfacial polymerization techniques such as those described in Japanese Patent Publications 38-19574, 42-446, 42-771 and the like; in-situ techniques based on the polymerization of monomers, such as those described in Japanese Patent Publication No. 36-9168, Japanese Patent Application Laid-Open No. 51-9079, and the like; and melting/dispersion/cooling techniques such as those described in UK Patents No. 952,807 and 965,074.

Any inorganic or organic materials may be used for forming the outside walls of the microcapsules 10 as long as the outside walls can be fashioned by the aforementioned capsule manufacturing method. A substance that adequately transmits light is preferred. Specific examples include gelatin, gum arabic, starch, sodium alginate, polyvinyl alcohol, polyethylene, polyamide, polyester, polyurethane, polyurea, polystyrene, nitrocellulose, ethyl cellulose, methyl cellulose, melamine-formaldehyde resins, urea-formaldehyde resins, and copolymers thereof.

Theoretically, the particle diameters of the microcapsules 10 should be as small as possible in order to make a high-resolution display device, but, in practice, the diameters ranges from preferably about 5 μm to about 200 μm, more preferably about 10 μm to about 50 μm because the charged particles 2a and 2b are encapsulated in the microcapsules.

The present embodiment will now be described with reference to a case in which charged particles 2a and 2b having two different types of color and charge polarity are encapsulated together with a liquid dispersion medium 4 in the microcapsules 10 by interfacial polymerization.

Various natural or synthetic oils or the like may be used in addition to water, alcohols, hydrocarbons, halogenated hydrocarbons and the like as the liquid dispersion medium 4.

Figure 2:
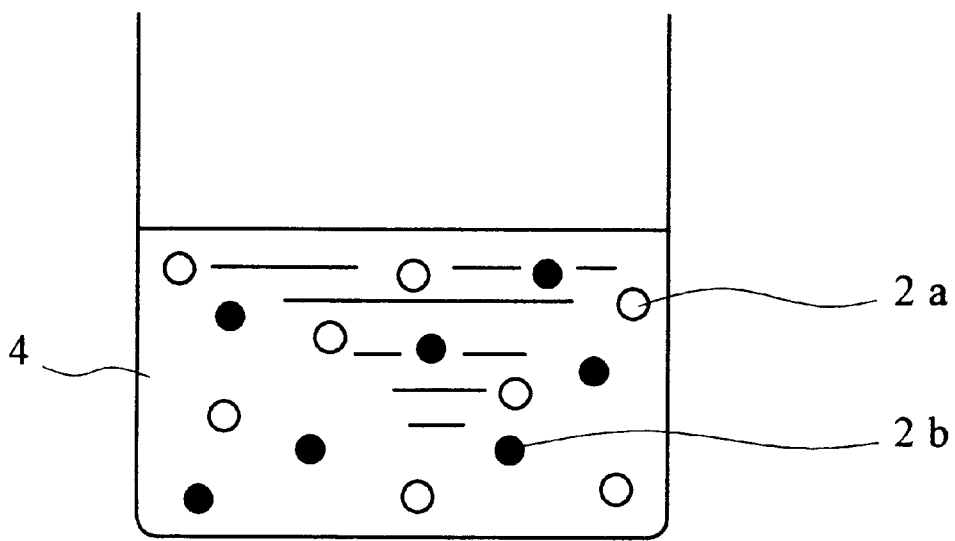
FIG. 2 is a schematic view depicting the manner in which charged particles are dispersed in a liquid dispersion medium.
Figure 3:
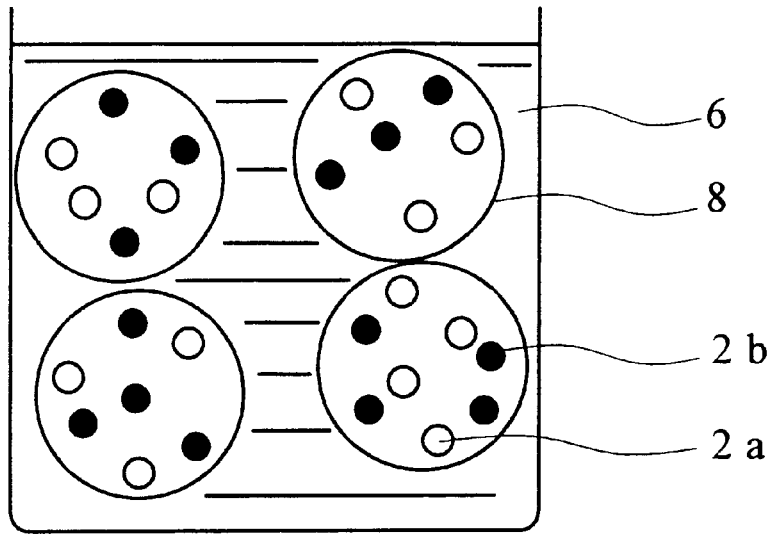
FIG. 3 is a schematic view depicting the manner in which a liquid dispersion medium containing charged particles forms an emulsion in an aqueous solution to which an emulsifier has been added.

First, the positively charged white charged particles 2a and the negative charged black charged particles 2b are uniformly dispersed in the liquid dispersion medium 4, as in FIG. 2. The resulting dispersion is then agitated and mixed with distilled water 6 containing an added surfactant, yielding an emulsion dispersion 8, as in FIG. 3. The disperse phase size of the emulsion dispersion 8 is adjusted to the desirable level by varying the agitation rate or the type or amount of an emulsifier or surfactant. It is also possible to appropriately add one or more emulsifiers, surfactants, electrolytes, lubricants, stabilizers, or the like as needed.

In this case, it is preferable for the charged particles 2 to have about 2 or less of a dispersion degree of the particle diameter distribution, expressed as volume-average particle diameter/number-average particle diameter, where the volume-average particle diameter indicates an average particle diameter derived from a volume-based particle diameter distribution and the number-average particle diameter indicates an average particle diameter derived from a number-based particle diameter distribution.

In more detail, the term "volume-average particle diameter" refers to a particle diameter value arrived at when the volumes corresponding to individual particle diameters are added up in increasing order of particle diameters and the cumulative value thereof reaches a total volume of 50%, whereas the term "number-average particle diameter" refers to a value obtained by dividing the sum of products of particle diameters and their numbers by the total number of particles.

Figure 4:
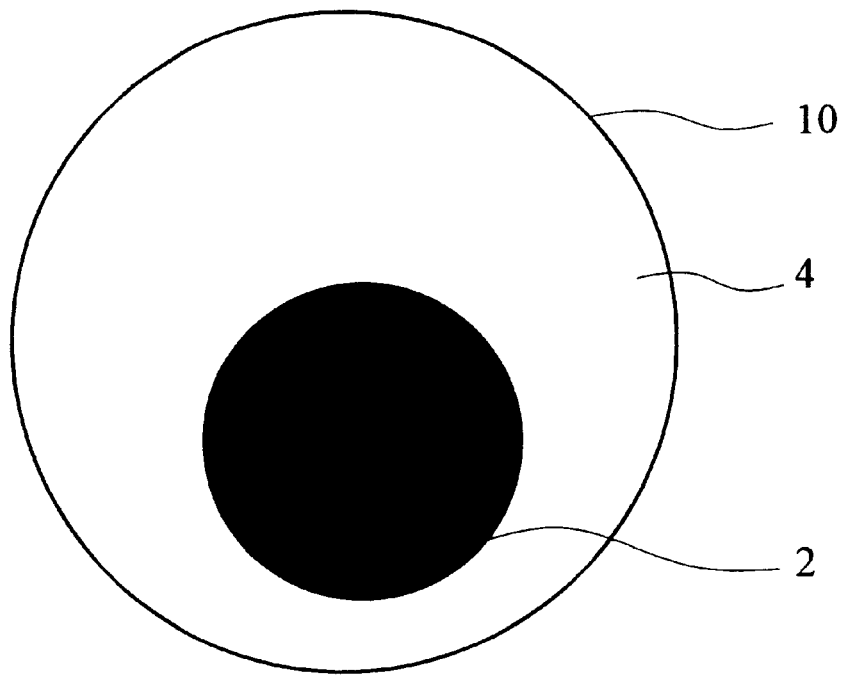
FIG. 4 is a cross-sectional view of a microcapsule depicting the manner in which a single large charged particle is encapsulated in the microcapsule.

Charged particles whose degree of dispersion is approximately greater than 2 have nonuniform particle diameters and are thus undesirable because when a capsules 10 is fabricated, only one large charged particle fits inside the capsule 10, as in FIG. 4. In addition, the particle diameter of the capsule 10 must be increased in order to overcome this shortcoming, bringing about a reduction in image resolution.

Figure 5:
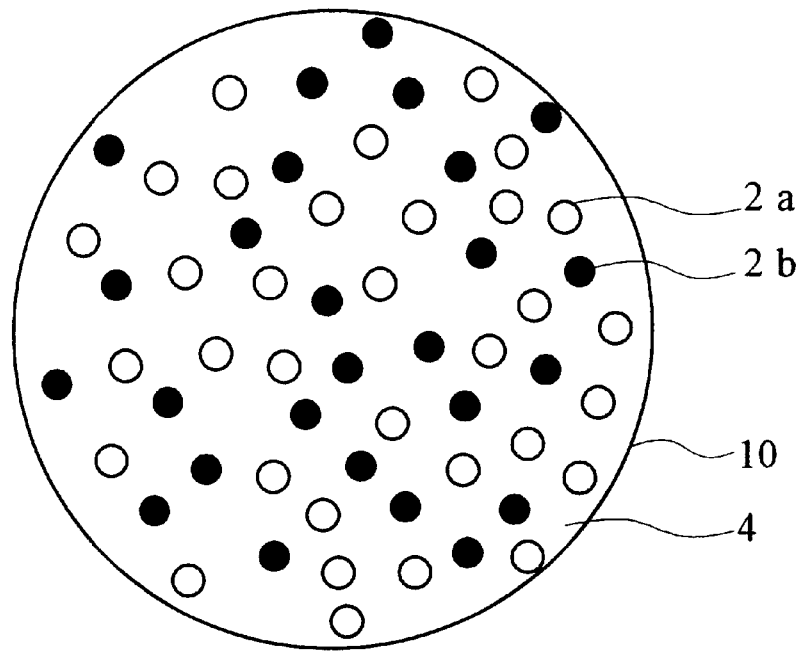
FIG. 5 is a cross-sectional view of a microcapsule depicting the manner in which charged particles are uniformly dispersed throughout the microcapsule.

Charged particles 2 whose dispersion degree is about 2 or less have uniform particle diameters, as in FIG. 5, and are thus dispersed uniformly throughout the liquid dispersion medium 4, making it possible to uniformly control the content of charged particles 2 in the microcapsule 10. A dispersion degree of 1 means that the volume-average particle diameter is equal to the number-average particle diameter, expressing a state in which the particles are dispersed completely uniformly.

Figure 6:
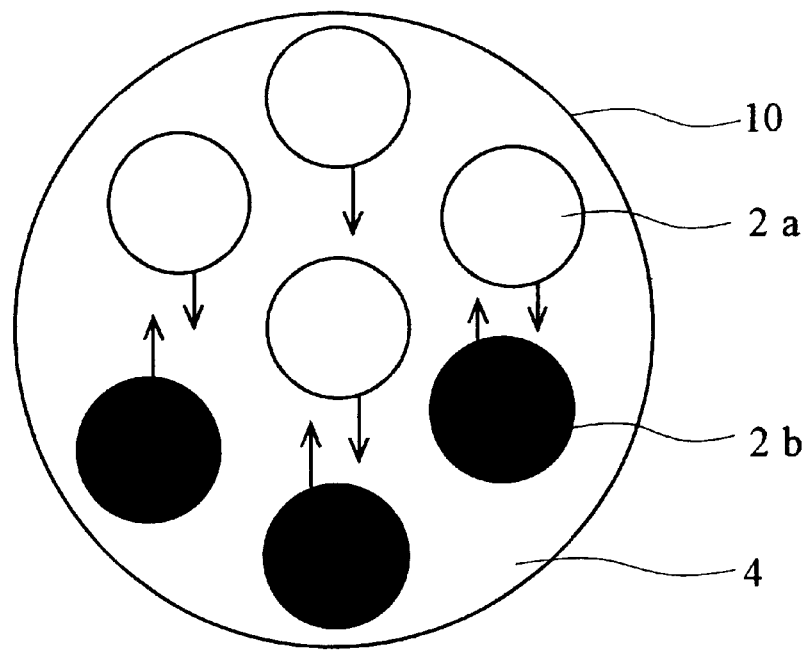
FIG. 6 is a cross-sectional view depicting the manner in which charged particles whose diameters are more than about ⅕ of the particle diameter of a microcapsule are encapsulated in the microcapsule.

In addition, the mean particle diameter of the charged particles 2 should be preferably about 1/1000 to about 1/5, more preferably about 1/1000 to about 1/100 of the particle diameter of the microcapsules 10. When an electric field is applied and images are formed using microcapsules 10 containing charged particles 2 whose diameters are more than about 1/5 of the diameter of the microcapsules 10, the charged particles 2a and 2b of different polarities interfere with each other's migration or result in a markedly lower response rate, as in FIG. 6. In addition, charged particles 2 whose diameters are less than about 1/1000 of that of microcapsules 10 ultimately aggregate inside the microcapsules 10, reducing response to the electric field or resulting in display defects.

The amount of the charged particles 2 should preferably be adjusted such that the volume of each of the charged particles 2 in the microcapsules 10 is preferably about 1.5% to about 25%, more preferably 10% to about 25% of the volume of the aforementioned microcapsules 10, and the total volume of all the charged particles 2 contained in the microcapsules 10 is about 1.5% to about 50%, more preferably 20% to about 50% of the volume of the microcapsules 10.

Figure 7:
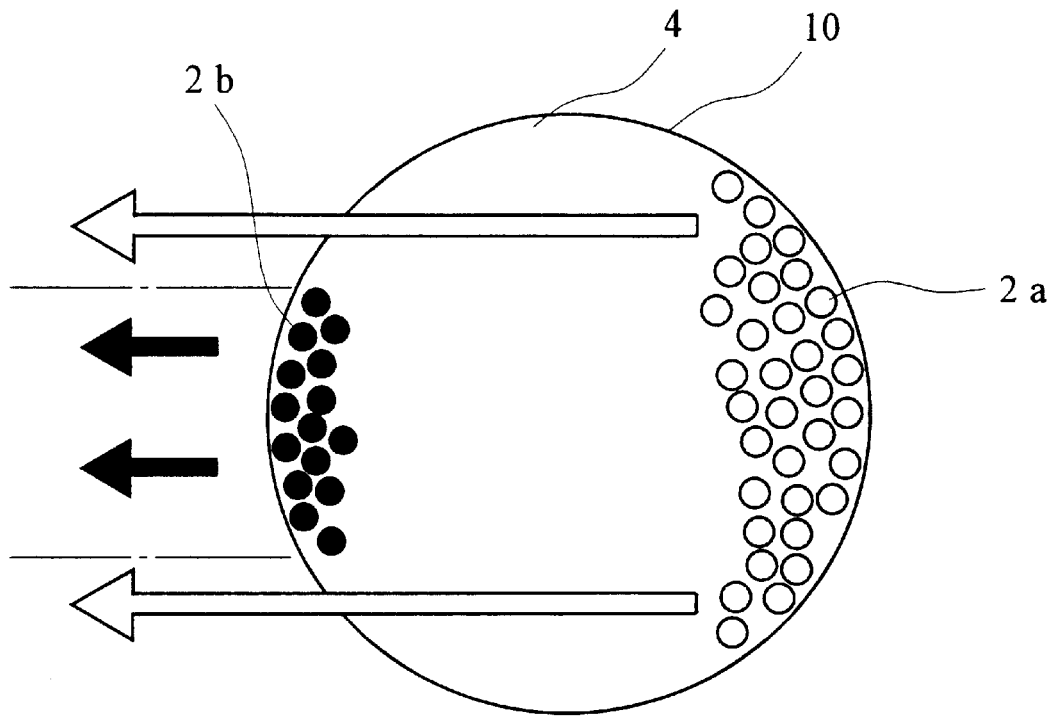
FIG. 7 is a schematic view depicting the manner in which, since the microcapsule contains too few particles of one color, the other color type of particles affects the displayed images.

If the volume of the charged particles 2 contained in the microcapsules 10 is less than about 1.5% of the volume of the microcapsules 10, the charged particles 2 fail to occupy half of the semispherical surface of each capsules even when these charged particles 2 are moved to the edges of microcapsule walls by a controlling electric field, lowering contrast or making the colors of differently colored admixed particles 2c visible to the observer, as in FIG. 7.

Figure 8:
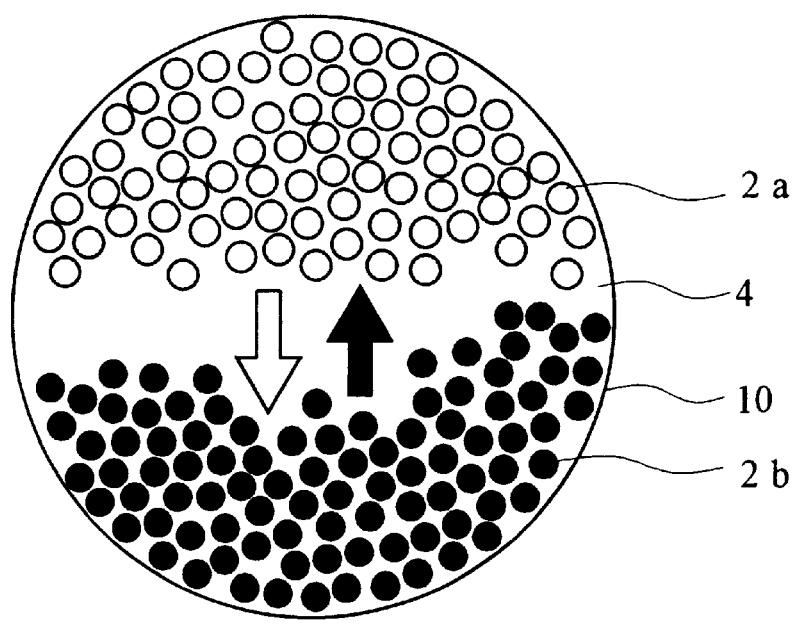
FIG. 8 is a schematic view depicting the manner in which collisions or the like among charged particles impede the instantaneous movement of the charged particles in response to changes in the electric field as a result of the fact that excessively large amounts of charged particles are present in microcapsules.

In addition, the charged particles 2a and 2b of different charge polarities will impede each other's migration as a result of collisions caused by the application of a controlling electric field if the volume of each of the charged particles 2a and 2b is greater than about 25% of the volume of the microcapsules 10 or if the total volume of the charged particles 2a and 2b contained in the microcapsules 10 is greater than about 50% of the volume of the microcapsules 10. The result is a marked reduction in the rate of response from the moment a controlling electric field is applied until the moment the images are completed, as in FIG. 8.

Polymerization particles may be appropriately used as the charged particles 2. Examples of particles other than polymerization particles include known colloid particles, various organic and inorganic pigments, dyes, metal powders, glass, resins, and other finely pulverized powders, but these are not easy to make into a material that would readily satisfy all the requirements for uniform particle diameters, coloration properties, and charging properties.

Examples of methods for manufacturing polymerization particles include suspension polymerization, emulsion polymerization, solution polymerization, and dispersion polymerization. Of these, dispersion polymerization, emulsion polymerization, and solution polymerization are preferred for particle manufacture because they allow particle diameters to be uniformly adjusted.

The following compounds may be used as the starting material monomers for the compositional material of the polymerization particles: methyl acrylate, ethyl acrylate, n-butyl acrylate, iso-butyl acrylate, 2-ethylhexyl acrylate, cyclohexyl acrylate, tetrahydrofurfuryl acrylate, methyl methacrylate, ethyl methacrylate, n-butyl methacrylate, iso-butyl methacrylate, 2-ethylhexyl methacrylate, stearyl methacrylate, lauryl methacrylate, methyl vinyl ether, ethyl vinyl ether, n-propyl vinyl ether, iso-butyl vinyl ether, n-butyl vinyl ether, styrene, α-methylstyrene, acrylonitrile, methacrylonitrile, vinyl acetate, vinyl chloride, vinylidene chloride, vinyl fluoride, vinylidene fluoride, ethylene, propylene, isoprene, chloroprene, butadiene, and the like.

Monomers having carboxyl groups, hydroxyl groups, methylol groups, amino groups, acid amide groups, glycidyl groups, and other functional groups may also be admixed into the aforementioned monomers. Examples of compounds having carboxyl groups include acrylic acid, methacrylic acid, and itaconic acid. Examples of compounds having hydroxyl groups include β-hydroxyethyl acrylate, β-hydroxyethyl methacrylate, β-hydroxypropyl acrylate, β-hydroxypropyl methacrylate, and allyl alcohol. Examples of compounds having methylol groups include N-methylolacrylamide and N-methylolmethacrylamide. Examples of compounds having amino groups include dimethylaminoethyl acrylate and dimethylaminoethyl methacrylate. Examples of compounds having acid amide groups include acrylamide and methacrylamide. Examples of compounds having glycidyl groups include glycidyl acrylate, glycidyl methacrylate, and glycidyl allyl ether. These monomers can be used individually or as mixtures of a plurality of monomers.

Various dyes can be cited as examples of the coloring matter (colorant) for the polymerization particles. In addition, quaternary ammonium salts, nigrosine compounds, and azo compounds can be cited as examples of charge-imparting agents for controlling the charging of the polymerization particles. The polymerization particles can be colored or charged by a process in which the particles are allowed to swell by being immersed in an appropriate solvent, a colorant or a charge-imparting agent is introduced into the particles, and the introduced colorant or charge-imparting agent is securely fixed inside the polymerization particles by diluting the solvent. Accordingly, such polymerization particles, in addition to being provided with uniform particle diameters, can also have the desired color and charging properties that are unaffected by the colorants.

The display device in accordance with the embodiment thus constituted allows prescribed images to be displayed by the charged particles 2a and 2b moving inside the microcapsules 10 in response to changes in a controlling electric field varied by the transparent electrodes 14.

The present invention is not limited to the embodiment described above in detail, and various modifications can be made as long as they remain within the scope of the present invention.

Figure 9:
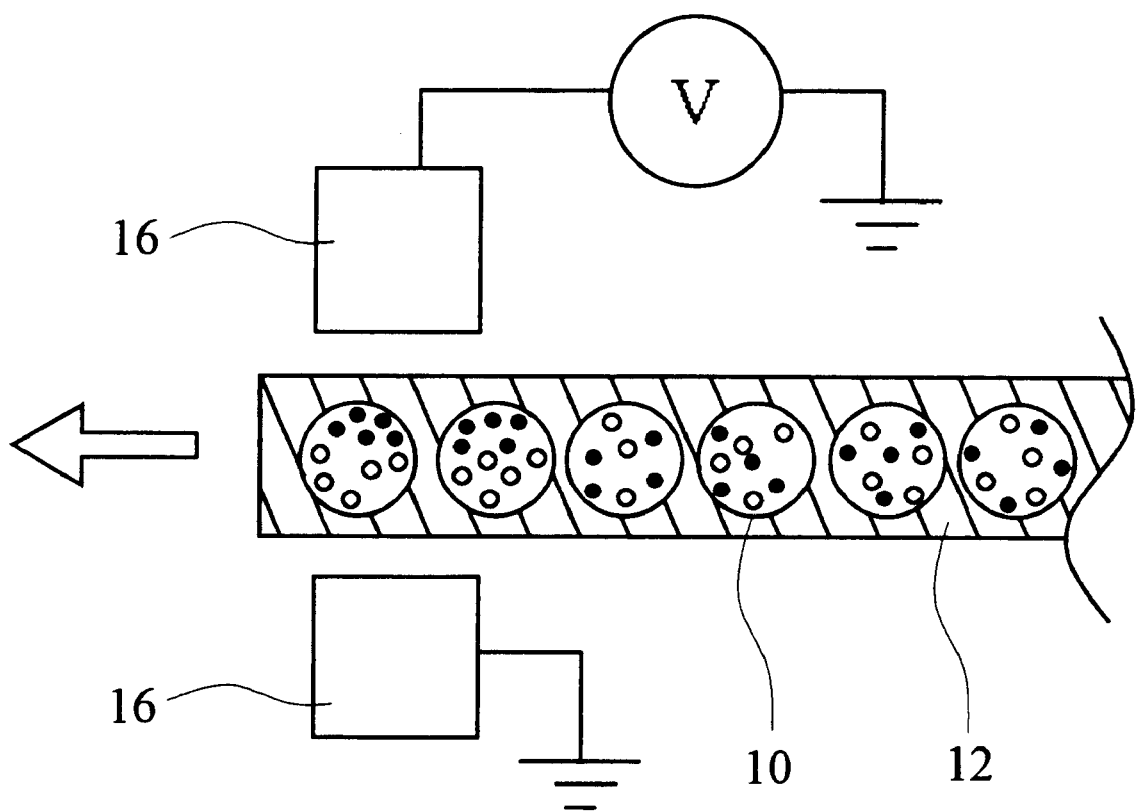
FIG. 9 is a diagram illustrating the manner in which images are formed on a flexible medium carrying microcapsules containing charged particles by moving this flexible medium between electrodes faced to each other.

For example, although, in the above-described embodiment, both of the numerous microcapsules 10 and the transparent electrodes 14 are not movable to each other, it is also possible to adopt a structure in which, as in FIG. 9, a flexible medium 12 containing fixed microcapsules 10 is made movable, and this flexible medium 12 is passed between a fixed pair of electrodes 16 faced to each other, and an electric field is applied as needed from the electrodes 16 in accordance with the passing distance of the medium, making it possible to display images.

EXAMPLES

The display device according to the present embodiment will now be described through working and comparative examples.

A detailed description of a microcapsule containing charged particles will first be given.

As the charged particles, styrene particles (specific gravity: 1.1 g/cm$^3$, produced by dispersion polymerization) was used. AS the charge-imparting agents, Polyvinylpyrrolidone (positive polarity) and E-84 (negative polarity, manufactured Orient Kagaku) were used. The particles having negative polarity were colored black with Kayalon Polyester S-200 (disperse dye manufactured by Nippon Kayaku). The following materials were also used.

| Liquid dispersion medium: | Isopar G (specific gravity 0.75 g/cm$^3$) manufactured by Exxon |
|---|---|
| Capsule wall material: | Gelatin |
| Aqueous solution of emulsifier: | 3% aqueous solution of vinyl ethyl ether/maleic anhydride copolymer |

White charged particles (mean particle diameter: 3 μm; dispersion degree of particle diameter distribution: 1.3) and black charged particles (mean particle diameter: 3 μm; dispersion degree of particle diameter distribution: 1.3) were mixed with a liquid dispersion medium in the desired ratio, and thoroughly dispersed with the aid of a stirrer and ultrasonic waves. The resulting dispersed solution and distilled water containing 3% added emulsifier were mixed and agitated with the aid of a stirrer, yielding an emulsion. The capsule wall material was added during agitation and mixing, yielding microcapsules containing a liquid dispersion medium and two types of charged particles.

The microcapsules thus obtained were placed between transparent electrodes, and their response to an electric field was measured. The response was considered adequate if images could be rapidly formed at an electric field strength of 100 V/mm.

Working Example 1

The following materials were used.
White charged particles: mean particle diameter=3 μm; dispersion degree of particle diameter distribution=1.3
Black charged particles: mean particle diameter=3 μm; dispersion degree of particle diameter distribution=1.3
(White charged particles):(black charged particles):(liquid dispersion medium)=22:22:45

One hundred μm size of microcapsules were manufactured from the aforementioned composition (given as a weight ratio). The volumetric ratios of the charged particles in the microcapsules were 20% for the white charged particles and 20% for the black charged particles.

These microcapsules were placed between electrodes, and responsiveness of image formation to the electric field was measured.

The images were highly responsive at an electric field strength of 100 V/mm, making it possible to obtain adequate display results.

Comparative Example 1

The following materials were used.
White charged particles: mean particle diameter=3 μm dispersion degree of dispersion of particle diameter distribution=3
Black charged particles: mean particle diameter=3 μm dispersion degree of particle diameter distribution=3
(White charged particles):(black charged particles):(liquid dispersion medium)=22:22:45

One hundred μm size of microcapsules were manufactured from the aforementioned composition (given as a weight ratio). The volumetric ratios of the charged particles in the microcapsules were 20% for the white charged particles and 20% for the black charged particles.

These microcapsules were placed between electrodes, and responsiveness of image formation to the electric field was measured.

Although the images could respond rapidly at an electric field strength of 100 V/mm, some particles did not change their color tone at all under the action of the electric field. This is considered because the microcapsules contained extremely large charged particles because of the high dispersion degree of the particle diameter distribution.

Comparative Example 2

The following materials were used.
White charged particles: mean particle diameter=3 μm dispersion degree of particle diameter distribution=1.3
Black charged particles: mean particle diameter=3 μm dispersion degree of particle diameter distribution=1.3

(White charged particles):(black charged particles):(liquid dispersion medium)=22:22:45

Ten μm size of microcapsules were manufactured from the aforementioned composition (given as a weight ratio). The volumetric ratios of the charged particles in the microcapsules were 20% for the white charged particles and 20% for the black charged particles.

These microcapsules were placed between electrodes, and responsiveness of image formation to the electric field was measured.

The images were unable to respond rapidly at an electric field strength of 100 V/mm, and flickering was observed when the images changed.

This is considered because the excessively large size of the charged particles in relation to the volume of the microcapsules caused particles with different polarities to impede each other's migration, resulting in lower response.

Comparative Example 3

The following materials were used.
White charged particles: mean particle diameter=3 μm dispersion degree of particle diameter distribution=1.3
Black charged particles: mean particle diameter=3 μm dispersion degree of particle diameter distribution=1.3
(White charged particles):(black charged particles):(liquid dispersion medium)=1.1:1.1:73.5

One hundred μm size of microcapsules were manufactured from the aforementioned composition (given as a weight ratio). The volumetric ratios of the charged particles in the microcapsules were 1% for the white charged particles and 1% for the black charged particles.

These microcapsules were placed between electrodes, and responsiveness of image formation to the electric field was measured.

The images could respond rapidly at an electric field strength of 100 V/mm or less, but contrast was low, making it impossible to obtain crisp images.

This is considerd because the charged particles in the microcapsules were extremely small.

Comparative Example 4

The following materials were used.
White charged particles: mean particle diameter=3 μm dispersion degree of particle diameter distribution=1.3
Black charged particles: mean particle diameter=3 μm dispersion degree of particle diameter distribution=1.3
(White charged particles):(black charged particles):(liquid dispersion medium)=38.5:38.5:22.5

One hundred μm size of microcapsules were manufactured from the aforementioned composition (given as a weight ratio). The volumetric ratios of the charged particles in the microcapsules were 35% for the white charged particles and 35% for the black charged particles.

These microcapsules were placed between electrodes, and responsiveness of image formation to the electric field was measured.

The images were unable to respond rapidly at an electric field strength of 100 V/mm.

This is considered because the charged particles in the microcapsules were extremely large.

As is apparent from the above description, the display device of the present invention makes it possible to prevent display defects from forming during image formation because the diameters of the aforementioned charged particles are about $1/1000$ to about $1/5$ of the particle diameters of the aforementioned microcapsules, and because the aforementioned charged particles are dispersed such that the dispersion degree of the particle diamter distribution, expressed as volume-average particle diameter/number-average particle diameter, ranges from 1 to about 2. In addition, the migration rate of each charged particle can be kept constant even when the display device is drived with low power, because the apparent electric charge on the particles in the liquid dispersion medium is kept uniform.

Furthermore, the display device makes it possible to display images with high picture quality, when the particle diameters of the aforementioned microcapsules are about 5 μm to about 200 μm, Moreover, the display device can form adequate images and be highly responsive, when the volume of each of the aforementioned charged particles constitutes from about 1.5% to about 25% of the volume of the corresponding microcapsule, and the total volume of all the charged particles in the aforementioned microcapsules constitutes from about 1.5% to about 50% of the volume of the aforementioned microcapsules.

In addition, the display device, when the aforementioned large number of microcapsules are supported on a flexible medium, makes possible to display images on a curved surface with the aid of the numerous microcapsules supported on the flexible medium.

Furthermore, the display device makes it easier to adjust the size distribution of the aforementioned charged particles, when they are comprised of at least one type of polymerization particles. In addition, the coloration and charging of the polymerization particles can also be readily controlled, because colorants or charge-controlling agents can be easily added during the manufacture of the particles. Another advantage is that the presence of a plurality of charged particles in the microcapsules dispenses with the need for continuous application of a controlling electric field in order to preserve the displayed images because the images displayed on the screen can be preserved for some time through interaction among the charged particles of various characteristics in the microcapsules even when the controlling electric field is no longer applied.

The entire disclosure of the specification, claims and summary of Japanese Patent application No. 09-277056 filed on Oct. 9, 1997 is herein incorporated by reference in its entirety.

What is claimed is:

1. A display device, which comprises a large number of microcapsules in which disperse systems of charged particles in a dispersion medium are encapsulated, and a pair of electrodes faced to each other disposed such that the microcapsules are sandwiched therebetween, and in which optical reflection characteristics are varied and the desired display operation is executed by varying the dispersion state of said charged particles under the action of controlling voltage; wherein the diameters of said charged particles are about $1/1000$ to about $1/5$ of the particle diameters of said microcapsules; and said charged particles are dispersed such that the dispersion degree of the particle diameter distribution, expressed as volume-average particle diameter/number-average particle diameter, ranges from 1 to about 2; the volume-average particle diameter indicating an average particle diameter derived from a volume-based particle diameter distribution and the number-average particle diameter indicating an average particle diameter derived from a number-based particle diameter distribution.

2. A display device according to claim 1, wherein the particle diameters of said microcapsules are about 5 μm to about 200 μm.

3. A display device according to claim 1, wherein the volume of each of said charged particles constitutes from about 1.5% to about 25% of the volume of the corresponding microcapsule; and the total volume of all the charged particles in said microcapsules constitutes from about 1.5% to about 50% of the volume of said microcapsules.

4. A display device according to claim 1, wherein said microcapsules are supported on a flexible medium.

5. A display device according to claim 4, wherein said microcapsules are not movable with respect to a pair of the electrodes.

6. A display device according to claim 4, wherein said flexible medium fixing the microcapsules is movable with respect to a pair of the electrodes.

7. A display device according to claim 1, wherein said charged particles are comprised of at least one type of polymerization particles.

\* \* \* \* \*